- United States Patent [19]

Cabestany et al.

[11] Patent Number: 4,481,116

[45] Date of Patent: Nov. 6, 1984

[54] CATIONIC AMINOPLASTIC RESIN, PREPARATION PROCESS AND APPLICATION THEREOF TO WATER TREATMENT

[75] Inventors: Jean Cabestany, Stains; Claude Trouve, Paris, both of France

[73] Assignee: Societe Francaise Hoechst, Puteaux, France

[21] Appl. No.: 448,094

[22] Filed: Dec. 9, 1982

[30] Foreign Application Priority Data

Dec. 29, 1981 [FR] France .................................. 81 24396

[51] Int. Cl.$^3$ ............................................. C08G 12/32
[52] U.S. Cl. ...................................... 210/735; 210/728; 524/284; 524/300; 524/417; 524/429; 524/435; 524/438; 524/598; 524/843; 528/245; 528/254
[58] Field of Search ................ 528/245, 254; 524/598, 524/843, 435, 300, 284, 417, 429, 438; 210/735, 728

[56] References Cited

U.S. PATENT DOCUMENTS

| | | | |
|---|---|---|---|
| 2,345,543 | 3/1944 | Wohnsiedler et al. | 524/598 |
| 2,485,079 | 10/1949 | Wohnsiedler et al. | 524/598 |
| 2,574,114 | 11/1951 | Lehmann | 8/116.3 |
| 3,645,841 | 2/1972 | Cabestany et al. | 524/35 |

FOREIGN PATENT DOCUMENTS

| | | |
|---|---|---|
| 2257548 | 8/1975 | France . |
| 2424234 | 11/1979 | France . |
| 831986 | 4/1960 | United Kingdom . |

*Primary Examiner*—Theodore E. Pertilla
*Attorney, Agent, or Firm*—Karl W. Flocks; Sheridan Neimark

[57] ABSTRACT

A novel cationic aminoplastic water-dispersible resin based on melamine, formaldehyde and glyoxal salified by a mineral or organic protonic acid, or by a mixture of such acids, selected from the group comprising hydrochloric, nitric, orthophosphoric, acetic, formic acids; it contains molar ratios, for 1 mole of melamine, of 2 to 4 moles of formaldehyde, 0.1 to 3 moles of glyoxal and 0.5 to 1 mole of mineral or organic protonic acid, or the equivalent quantity of a mixture thereof.

20 Claims, No Drawings

CATIONIC AMINOPLASTIC RESIN, PREPARATION PROCESS AND APPLICATION THEREOF TO WATER TREATMENT

This invention relates to a novel cationic aminoplastic resin, its process of preparation and the application thereof to water treatment.

Aminoplast resins are well known and broadly used. According to U.S. Pat. No. 3,377,274, cationic aminoplast resins such as those described in U.S. Pat. Nos. 2,345,543 and 2,485,079 can be used for clarification of waters containing small quantities of suspension materials. Such resins are hydrophilous acid salified melamine-formaldehyde or melamine-urea-formaldehyde polymers. Resins of a particular composition such as those described in French Pat. No. 2 257 548 have a higher efficiency.

These salified aminoplastic resins based on melamine or melamine and urea and formaldehyde have poor stability in an acid aqueous medium, said stability becoming very poor upon the storage temperature reaching the usual ambient temperatures existing in tropical or equatorial regions. This instability in an acid aqueous medium is well known and today it constitutes one of the major obstacles to commercial development thereof. Various solutions have been proposed to remedy more or less partly this major inconvenience. Thus, U.S. Pat. No. 4,182,839 proposes to effect partial methylation of the methylol groupings of a melamine-formaldehyde resin rendered cationic through condensation with an aminated derivative; but if such modified resin preserves good efficiency in the improvement of paper resistance in the moist conditions it has however no action in water treatments as shown by comparative examples explained hereinafter.

Another solution taught in U.S. Pat. No. 3,645,841 consists of introducing glyoxal or replacing formaldehyde by glyoxal. Such aminotriazine-glyoxal or aminotriazine-glyoxal-formaldehyde resins obtained under pH conditions close to neutrality cannot be rendered water-dispersible; however being quaternized with dimethylsulfate they obtain good solubility in water and become good organic coagulants for waters containing small quantities of suspension or emulsion materials (see French Pat. No. 2,424,234). Such aminotriazine-glyoxal or melamine-glyoxal-formaldehyde quaternized resins are time stable at a temperature of 20° C. and constitute efficient coagulants.

It is also known that condensation of formaldehyde with amino- and/or amido groupings is catalyzed both by acids and by bases. However, to prevent the phenomenon of gelification of the condensation medium, the aldehyde-nitrogenous derivative condensation is carried out in alkaline medium, then when condensation has reached a certain stage condensation is stopped by cooling and water dilution. When the nitrogenous derivative is melamine, and by realizing such dilution with an acidified water, there is generally obtained a resin in cationic form dispersible or soluble in such aqueous solution.

The instability in acid aqueous medium of the conventional melamine-formaldehyde cationic resins used ordinarily for water treatment which very often results practically in progressive setting of the resin to a mass can be explained by the property of methylol groupings to form methylene bridges.

The Applicant has now unexpectedly discovered novel cationic water-dispersible resins possessing excellent applicational properties for treatment of waters associated with a remarkable time stability both at the ambient temperature and at higher temperatures close to 50° C. These novel melamine-formaldehyde-glyoxal based resins are salified by a mineral or organic protonic acid, or a mixture of such acids, such as hydrochloric acid, orthophosphoric acid, formic acid. If melamine is designated as M, formaldehyde as F, glyoxal as G, and the mineral or organic acid as AH, the resin according to the invention has the following molar composition:

$$1M/0.1-3\ G/2-4\ F/0.5-1\ AH.$$

In other terms, 1 mole of melamine corresponds to 0.1 to 3 moles of glyoxal, 2 to 4 moles of formaldehyde, and 0.5 to 1 mole of mineral or organic protonic acid, or the equivalent quantity of a mixture of such acids. As mentioned above the known melamine-formaldehyde-glyoxal resins are not dispersible in an acid aqueous medium due to an acid hydrolysis which results in significant decrease of the viscosity of such resins (see U.S. Pat. No. 3,645,841). The Applicant has now unexpectedly discovered that it is possible to obtain directly in one stage a resin according to the invention by heating the mixture of the reactant in the above-mentioned molar ratios, although the reaction is effected continuously at an acid pH of between 2 and 5.

The object of the invention is therefore also a process for the preparation of such resins.

According to the process a resin in accordance with the invention is obtained at an acid pH of between 2 and 5, advantageously of between 3 and 3.5 and at a condensation temperature lower than 100° C., advantageously of between 70° and 80° C., by initially mixing all the reactants: melamine, formaldehyde, glyoxal and the mineral or organic acid, or a mixture of such acids, in such a water quantity that the initial concentration (Co) of the reactants is between 20 and 30% by weight, advantageously between 20 and 25% by weight.

The condensation reaction is followed by viscosimetric analysis of the reactional medium with a viscosimetric flow tube having a coefficient K' close to 0.001. When the viscosity of the reaction medium reaches the value of 35±5 centipoises, as determined at 20° C. from a test portion brought to a concentration of 20% by weight, the condensation is stopped by cooling and dilution with a water quantity such that the final resin concentration expressed in g per 100 g is of between 5 and 20, advantageously, of between 10 and 15. This final resin concentration is determined by heating 1 g of the sample for 1 hour at 140° C.

According to the process of the invention, the reactants are technical commercial products and the aldehydes, i.e. formaldehyde and glyoxal are used in an aqueous solution in their usual commercial presentation. The mineral or organic protonic acid is generally selected among the following acids: hydrochloric acid, orthophosphoric acid, technical formic acid, pure acetic acid, nitric acid.

The reaction speed is influenced by the Co, the pH and the temperature. A reaction speed compatible with an economical industrial production is obtained by carrying out the process according to the invention at a pH of between 3 and 3.5 with a Co of 20 to 25% by weight, and at a temperature of 75°–80° C.

The resin according to the invention is presented in form of an aqueous opalescent solution having a pH of between 2 and 5, a proportion of free glyoxal determined by polarography lower than, or equal to 0.1% by weight and a Brookfield viscosity determined by a Brookfield viscosimeter, model RVT, at a speed of 100 revolutions per minute as being 50±10 centipoises.

The resin according to the invention is storage stable both at the ambient temperature and at 50±5° C. Such stability at 50° C. is for greater than 3 months. If one follows the development of the Brookfield viscosity of the resin according to the invention, as a function of time, at various temperatures, it may be observed that such viscosity is stable at the ambient temperature and increases only slightly at 50° C. Such excellent stability as a function of time and temperature probably results from the presence of glyoxal in resin. As a matter of fact, it is observed that resin stability is the better the higher the proportion of implemented and combined glyoxal.

It is known to use cationic aminoplast resins as organic coagulants with waters containing small quantities of materials in suspension, emulsion or solution. French Pat. No. 2 257 548 teaches that the best results are obtained in water treatment with melamine-formaldehyde hydrosoluble resins when certain conditions are met relative to quantities of formaldehyde and acids used. However, utilization of such particular resins very often requires the pH of waters to be treated to be preliminarily determined and if need be, the setting thereof to a value compatible with the type of resin used, thereby presenting the drawback of introduction into the waters to be treated of electrolytes which might prove to become a nuisance upon the use of such waters. Due to their excellent stability, the resins according to the invention do not require such laborious processes for determination and setting of the pH of waters to be treated; moreover, as compared to the known aminoplast resins, they have better efficiency during their use with certain waters such as those enriched with dissolved mineral salts such as e.g. sea waters. Furthermore, a resin according to the invention admixed with the usual mineral coagulants such as aluminum polychloride, ferric chloride, develops a complementary effect. A particularly interesting composition may consist of a major proportion of the resin according to the invention in water and of 0 to 20% by weight of ferric chloride. It can also be used in admixture with the usual organic flocculents such as the copolymers derived from acrylamide.

The object of this invention is therefore also the application of resins according to the invention to treatment of raw waters and residual waters and more especially, to such raw and residual waters which contain little quantities of materials in suspension, emulsion or solution.

According to such applications the proportion of melamine-formaldehyde-glyoxal salified resins can be varied depending upon the characteristics of the solution, the emulsion, or suspension to be treated, or the nature and characteristics of the materials contained therein.

Generally, the resin according to the invention is used in quantities expressed in 100% resin, of between 1 and 500 ppm, preferably, 1 to 20 ppm, with raw waters, and 20 to 300 ppm, for residual waters. When other products are used in conjunction with the resin according to the invention, the proportion of resin can be decreased or increased, depending on the nature and quantity of these other products.

According to this invention it is possible to precipitate or flocculate quickly, not only those materials dispersed in form of suspension or emulsion, but also certain materials dissolved in waters to be treated. Due to the excellent stability thereof the resin according to the invention can be used associated with from 0 to 20% by weight of a mineral or organic acid selected from the group comprising hydrochloric, nitric, orthophosphoric, acetic and formic acids, or mixtures thereof. An advantageous composition for treating certain waters may consist of an association of a major proportion of a resin according to the invention and a proportion of between 0 and 20% by weight of orthophosphoric acid.

The following examples and comparative examples describe this invention in a more specific manner. They merely illustrate and do not at all limit the invention.

EXAMPLE 1

There is heated at 75°–80° C. a mixture of:
201 g of glyoxal in 40 g/100 g aqueous solution,
318 g of formaldehyde in a 52.4 g/100 g aqueous solution,
175 g of crystallized melamine,
75 g of 37 g/100 g hydrochloric acid,
1187 g of demineralized water.

The condensation is followed up by viscosimetric analysis. When a viscosity of 35±5 centipoises is reached, determined at 20° C. and 20 g/100 g dilution, with a viscosimeter of the Oswald type, having a coefficient K' of about 0.001, there is introduced:
1044 g of demineralized water,
then the reaction medium is cooled quickly at 20° C.

Thus, there is obtained 3 kg of resin of the M1/G1/F4/HCl 0.55 molar composition, having a viscosity as determined at 20° C., by a Brookfield viscosimeter, model RVT, rotating at a speed of 100 revolutions per minute, of 50±10 centipoises. Such resin has a pH of 3, a ratio of free glyoxal of 0.1 g/100 g, as determined by polarography, a dry extract of 12.5±0.5 g/100 g, realized by heating a sample of 1 g for 1 hour at 140° C., and a cationicity of 1.6 meq/g.

EXAMPLES 2 TO 4

By operating as in example 1, but replacing hydrochloric acid by various other acids, there are obtained the following resins defined by their molar compositions:

M1/G1/F4/HNO$_3$ 0.6
 characteristics of the resin: pH=3.15
 Brookfield viscosity, V 100, 20° C.,=34 centipoises,
 Cationicity: 1.73 meq/g
 dry extract (1g/1h/140° C.): 12.3 g/100 g.

M1/G1/F4/HCOOH 0.7
 characteristics of the resin:
 pH=3.5
 Brookfield viscosity, V 100, 20° C.=29 centipoises
 Cationicity: 1.44 meq/g
 dry extract (1g/1h/140° C.)=7.3 g/100 g.

M1/G1/F4/H$_3$PO$_4$ 0.8
 characteristics of the resin:
 pH=2.35
 Brookfield viscosity, V 100, 20° C.=39 centipoises
 Cationicity: 1.81 meq/g
 dry extract (1g/1h/140° C.): 12.1 g/100 g.

EXAMPLE 5—COMPARATIVE EXAMPLE

There is prepared a resin A as described in example 1 of U.S. Pat. No. 4,182,839. Such resin having a molar composition M1/F 15/TEA 0.75/HCl 0.8, wherein the abbreviation TEA represents triethanolamine, has a pH of 7.0, a cationicity of 0.83 meq/g and a Brookfield viscosity, V 100, determined at 20° C., of 57 centipoises.

EXAMPLE 6—COMPARATIVE EXAMPLE

There is heated at 70°–75° C. the following mixture:
45.82 g (0.363 mole) of melamine,
81.82 g (1.36 moles) of formaldehyde in a 50 g/100 g aqueous solution,
35.86 g (0.363 mole) of 37 g/100 g concentrated hydrochloric acid,
503.17 g of distilled water.

When the viscosity of the reaction medium as determined with a flow viscosimeter at 20° C. is close to 0.05 poise, the reaction medium is quickly cooled and it is thereafter diluted with 333.33 g of distilled water. There is thus obtained 1 kg of resin presenting a dry extract of 7.72 g/100 g (after drying for 1 hour at 140° C.), a pH of 1.4, a Brookfield viscosity determined at 20° C. at a speed of 100 revolutions per minute, of 20 centipoises and a measured cationicity of 2.30 meq/g. The resin has the following molar composition: M1/F 3.75/PCl 1.

EXAMPLE 7

A residual water having a chemical oxygen demand, C.O.D. of 510 mg/l, determined according to AFNOR NF T 90–101 specification, is treated with various quantities of either resin prepared according to Example 1, or ferric chloride. After introduction in one time of the coagulant into the water to be treated, the suspension is agitated at 140 revolutions per minute for 3 mn, then the turbidity of the supernatant is determined after 20 mn. rest by means of a commercial turbidimeter. The measured turbidity is expressed in NTU units also called at times JACKSON units.

The following results are obtained depending on the quantity of coagulant expressed in ppm of dry product.

| Quantity | Turbidity of supernatant expressed in N.T.U. units | |
| --- | --- | --- |
| in ppm | Resin acc. to Ex. 1 | Ferric chloride |
| 0 | 80 | 80 |
| 20 | 35 | |
| 30 | 17 | |
| 60 | 3 | |
| 80 | 1 | |
| 160 | 0.8 | |
| 200 | | 30 |
| 260 | | 20 |
| 340 | | 14 |
| 400 | | 10 |

It is also observed that the size of aggregates formed with the resin according to Example 1 is much higher than that obtained with ferric chloride.

EXAMPLE 8

Through successive tests there is determined the minimum quantity of coagulant as necessary for obtaining a turbidity of 10 NTU in the treatment of a silica suspension of low granulometry (average diameter: 0.2 micron, SYTON W30, commercialized by the firm MONSANTO) at 1.08 g/100 g (turbidity of such suspension after 5 mn agitation: 160 NTU) under the following conditions:

preparation of an aqueous solution of coagulant by introducing 10 cm3 of the resin as such into a 100 cm3 gauged flask and completing to 100 cm3 with drinkable water.
introduction of the coagulant quantity in one time into 500 cm3 of test suspension,
stirring at 50 revolutions per minute for 3 mn,
then, resting for 30 mn.,
careful taking a sample of 25 cm$^3$ of supernatant and determination of turbidity thereof by a commercial turbidimeter,
plotting the curve of turbidity as a function of the coagulant quantity.

The following results are obtained by operating with resins prepared according to Example 1, having a dry extract of 12.5 g/100 g:

| Quantity of coagulant | | |
| --- | --- | --- |
| expressed in cm3 of diluted solution | expressed in ppm of dry resin | Measured turbidity expressed in N.T.U. |
| 2 | 50 | 30 |
| 2.25 | 56.2 | 17 |
| 2.5 | 62.5 | 9 |
| 2.75 | 68.7 | 9 |

To reduce the turbidity of a silica suspension of 160 NTU to 10 NTU, 0.245 cm3 of resin prepared according to Example 1, i.e. 61.2 ppm is required.

EXAMPLE 9

Treatment of residual refinery waters containing 230 ppm of hydrocarbons

The residual hydrocarbon content expressed in ppm is determined according to AFNOR T 90–203 specification as a function of time expressed in minutes, of an aqueous solution containing 230 ppm of hydrocarbons, after introduction of 2.5 ppm expressed in dry extract of resin according to Example 1.

The following results are obtained at the temperature of 20° C.

| Time in minutes | Residual hydrocarbon contents expressed in ppm |
| --- | --- |
| 0 | 230 |
| 2.5 | 200 |
| 5 | 170 |
| 7.5 | 140 |
| 10 | 110 |
| 12.5 | 80 |
| 15 | 50 |
| 20 | 30 |

EXAMPLE 10

Clarification test on synthetic sea water

There is prepared a suspension of the sea water type by dispersing 2.5 ppm of silica of low granulometry, average diameter of particles: 0.2 micron (SYTON W30), in a soft water containing 30 g/l of sodium chloride, 4 g/l of anhydrous sodium sulfate and 0.2 g/l of sodium bicarbonate.

On the other hand, an acidified resin solution is prepared by adding 80 g of 98% crystallized orthophosphoric acid to 1 liter of resin prepared according to Example 1.

A sample of such suspension is treated by 11.2 ppm of the above solution, then such a sample and an untreated control sample are filtered through a sand filter at the speed of 5 m/h. The corresponding eluates are collected in a 200 cm3 fraction and then the turbidity of each fraction is measured with a commercial turbidimeter.

The following results are obtained:

|  | Turbidity of eluates expressed in N.T.U. | |
| --- | --- | --- |
| Collected eluates | Test | Control test |
| 0–200 | 0.71 | 0.95 |
| 200–400 | 0.47 | 0.83 |
| 400–600 | 0.34 | 0.81 |
| 600–800 | 0.25 | 0.81 |
| 800–1000 | 0.20 | 0.81 |
| 1000–1200 | 0.17 | 0.81 |
| 1200–1400 | 0.16 | 0.81 |
| 1400–1600 | 0.13 | 0.81 |
| 1600–1800 | 0.12 | 0.81 |

EXAMPLE 11

An aqueous emulsion is prepared, containing 250 ppm of residual refinery oil. After a treatment for 1 mn. with an ULTRATURAX apparatus, followed by agitation at 200 revolutions per mn. for 1 mn., and at 45 revolutions per minute for 14 mn., various samples of such emulsion are treated with various quantities of tested resins. Then, after a 5 mn.floatation with pressurized water, the turbidity of the sample is measured.

The following results are obtained:

| | Measured turbidity expressed in N.T.U. | | | | |
| --- | --- | --- | --- | --- | --- |
| Quantity of resin used expressed in ppm | Resin acc. to Example 1 | Resin acc. to Example 2 | Resin acc. to Example 3 | Resin acc. to Example 4 | Resin acc. to Example 5 |
| 0.5 | 65 | 65 | 65 | 65 | 65 |
| 1 | 40 | 40 | 36 | 42 | 67 |
| 2.5 | 14 | 14 | 10 | 14 | 86 |
| 5 | 7 | 7 | 4 | 8 | 92 |

EXAMPLE 12

Filtration test

A suspension is prepared containing 20 g/l of sodium chloride, 5 ppm of silica of low granulometry, average diameter of particles: 0.2 micron (SYTON W30) and 1 ppm of chlorine.

Such suspension has a pH of 7.5 to 8.

The test consists of evaluating the efficiency of a coagulant by measuring the percentage of elimination of particles of a diameter lower than 2 microns, after filtration at a speed of 50 m/h through a sand filter having a cross-section of 38.5 cm2 and a filtering layer of 1 m filled with sand of an average granulometry of 0.75 mm. The counting of particles is effected through a COULTRONIC apparatus. The number of particles per cm3 having a diameter lower than 2 microns before treatment and before filtration is:
$\overline{M} = 8{,}600$, $\sigma = 6{,}150$, and after filtration, $\overline{M} = 4{,}050$, $\sigma = 3{,}500$.

The following results are obtained:

| Quantity of resin used in ppm | Percentage of elimination of particles of diameter lower than 2 microns. | |
| --- | --- | --- |
| | Resin according to Example 1 | Resin according to Example 6 |
| 0.5 | | |
| 0.75 | 67% | <40% |
| 1 | 93–95% | <40% |
| 1.5 | 94–97% | <40% |
| 2 | | <40% |
| 3 | | <40% |

EXAMPLE 13

Clog up power

A suspension is prepared containing 20 g/l of sodium chloride, 2 ppm of silica of low granulometry, average diameter of particles: 0.2 micron (SYTON W30), and 1 ppm of chlorine. Such suspension has a pH of 7.5–8.0, and a turbidity of 1 NTU.

The test consists of calculating the clogging power of a 0.45 micron MILLIPORE filter having a diameter of 47 mm through which the above suspension treated with various quantities of coagulants to be tested is filtered. To this end, there is timed the passage of 500 cm3 of such treated suspension under a pressure of 2.1 bars, wherein Ti is the initial measured time expressed in mn., then after a period of operation of 15 mn. during which the treated suspension is filtered through such filter, the passage of 500 cm3 under the same pressure is again timed and let Tg be the measured time expressed in mn. The clogging power at the pressure of 2.1 bars is given by the following equation:

$$P_{2,1} = 100\,(1 - Ti/Tg)$$

and the Fouling index, FI, is calculated by the following relation:

$$FI = P_{2,1}/T$$

wherein T represents the time expressed in mn. which separates measurements of times Ti and Tg, i.e. T=15.

| Quantity of resin used expressed in ppm | Fouling Index | |
| --- | --- | --- |
| | Resin according to Example 1 | Resin according to Example 6 |
| 0.5 | 5.6 | not measurable |
| 1 | | not measurable |
| 1 then 0.5 | | 5.6 |

It will be understood that this invention was only described in a purely explanatory and not a all limitative manner and that any useful modification can be brought thereto without departing from its scope, as defined in the attached claims.

We claim:

1. A novel water-dispersible cationic aminoplast resin which is a condensation product of melamine, formaldehyde and glyoxal, said resin being salified by a mineral or organic protonic acid or a mixture of these acids selected from the group consisting of hydrochloric, nitric, orthophosphoric, acetic, and formic acids, and containing in molar ratios, for one mole of melamine, from 2 to 4 mole of mineral or organic protonic acid, or the equivalent quantity of a mixture of such acids.

2. A resin according to claim 1, containing for one mole of melamine, 4 moles of formaldehyde, 1 mole of glyoxal and 0.55 mole of hydrochloric acid.

3. A resin according to claim 1, containing for one mole of melamine, 4 moles of formaldehyde, 1 mole of glyoxal and 0.8 mole of orthophosphoric acid.

4. A process for preparation of the resin according to claim 1, comprising reacting at a temperature lower than or equal to 100° C., at an acid pH of between 2 and 5, the whole of the constituents of the resin, in the molar proportions corresponding to 2 to 4 moles of formaldehyde, 0.1 to 3 moles of glyoxal and 0.5 to 1 mole of mineral or organic acid, or the equivalent quantity of a mixture of such acids, for one mole of melamine, in a body of water such that the initial reactants concentration is of between 20 and 30 g per 100 g, and when condensation has reached a certain stage determined by a viscosity value of the reaction medium, of 35±5 centipoises as determined from a cooled sample diluted at the rate of 20 g for 100 g, stopping the reaction by cooling and water dilution.

5. A process according to claim 4, wherein the condensation reaction is carried out advantageously at a pH of between 3 and 3.5.

6. A process according to claim 4, wherein the condensation is carried out at a temperature of between 75° and 80° C.

7. A resin according to claim 1, useful in the treatment of raw waters and residual waters.

8. A resin according to claim 7, useful in treating raw waters and residual waters containing little quantities of suspension, emulsion or solution materials.

9. A resin according to claim 7, useful in treating residual waters containing mineral salts, of sea water type.

10. A resin according to claim 7 used conjointly with a coagulant selected from the group consisting of mineral and organic coagulants.

11. A resin according to claim 10, used conjointly with a mineral ferric chloride coagulant.

12. A resin according to claim 7 used for raw waters in quantities of between 1 and 20 ppm.

13. A resin according to claim 7 used for residual waters in quantities of between 20 and 500 ppm.

14. An aqueous coagulant composition comprising a major proportion of a resin according to claim 1, and a proportion of between 0 and 20% by weight of a mineral or organic acid selected from the group consisting of hydrochloric, nitric, orthophosphoric, acetic and formic acids, or a mixture of such acids.

15. A coagulant composition according to claim 14, wherein said acid is orthophosphoric acid.

16. A coagulant composition according to claim 14, comprising a major proportion of said resin and a proportion of between 0 and 20% of ferric chloride.

17. A resin composition according to claim 11, wherein said ferric chloride mineral coagulant is present in an amount of up to 20% by weight.

18. A resin composition according to claim 1 having a concentration based on the reactants of 20-30% by weight in water.

19. A resin according to claim 7 which is the condensation product of said melamine, said formaldehyde, said glyoxal and said acid present in an amount of 20-30 weight percent in a body of water, condensation having been stopped when the viscosity reaches 35±5 centipoises as determined from a cooled sample diluted at the rate of 20 g for 100 g.

20. A method of water treatment comprising adding to water in need of purification between 1 and 500 ppm of a resin made according to the process of claim 4.

* * * * *